US008052809B2

(12) United States Patent
Hartmann et al.

(10) Patent No.: US 8,052,809 B2
(45) Date of Patent: *Nov. 8, 2011

(54) IRON-BASED BRAZING FOIL AND METHOD FOR BRAZING

(75) Inventors: Thomas Hartmann, Altenstadt (DE); Dieter Nuetzel, Hainburg (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 542 days.

This patent is subject to a terminal disclaimer.

(21) Appl. No.: 12/155,399

(22) Filed: Jun. 3, 2008

(65) Prior Publication Data

US 2008/0318082 A1 Dec. 25, 2008

Related U.S. Application Data

(60) Provisional application No. 60/929,185, filed on Jun. 15, 2007.

(30) Foreign Application Priority Data

Jun. 15, 2007 (DE) .......................... 10 2007 028 275

(51) Int. Cl.
 *C22C 45/02* (2006.01)
(52) U.S. Cl. ............ 148/403; 148/330; 420/87; 420/92; 420/93
(58) Field of Classification Search .................... 148/403
See application file for complete search history.

(56) References Cited

U.S. PATENT DOCUMENTS

| | | | |
|---|---|---|---|
| 2,880,086 A | | 3/1959 | Cape |
| 3,303,024 A | | 2/1967 | Cape et al. |
| 4,250,229 A | * | 2/1981 | Kear et al. ................. 428/606 |
| 4,302,515 A | | 11/1981 | DeCristofaro et al. |
| 4,402,742 A | | 9/1983 | Pattanaik |
| 4,410,604 A | | 10/1983 | Pohlman et al. |
| 4,444,587 A | | 4/1984 | Kelly |
| 4,473,401 A | | 9/1984 | Masumoto et al. |
| 4,516,716 A | | 5/1985 | Coad |
| 4,528,247 A | | 7/1985 | Mizuhara |
| 4,543,135 A | | 9/1985 | Bose et al. |
| 4,745,037 A | | 5/1988 | DeCristofaro et al. |
| 4,900,638 A | | 2/1990 | Emmerich |
| 4,913,752 A | | 4/1990 | Falk |
| 5,183,636 A | | 2/1993 | DuBois |
| 5,855,933 A | | 1/1999 | Schmetz |
| 6,656,292 B1 | | 12/2003 | Rabinkin et al. |
| 7,276,128 B2 | | 10/2007 | Herzer et al. |
| 2004/0056074 A1 | | 3/2004 | Sjodin |
| 2004/0184945 A1 | | 9/2004 | Sjodin |
| 2006/0090820 A1 | | 5/2006 | Rabinkin et al. |
| 2007/0175545 A1 | | 8/2007 | Urata et al. |
| 2008/0063903 A1 | | 3/2008 | Nuetzel et al. |
| 2009/0130483 A1 | | 5/2009 | Hartmann et al. |

FOREIGN PATENT DOCUMENTS

| | | |
|---|---|---|
| DE | 1059191 | 6/1959 |
| DE | 2755435 A1 | 6/1978 |
| DE | 3011152 A1 | 10/1980 |
| DE | 3929222 A1 | 3/1991 |
| DE | 4234961 A1 | 4/1994 |
| DE | 19610539 A1 | 9/1997 |
| DE | 19805142 A1 | 8/1999 |
| DE | 69609962 T2 | 1/2001 |
| DE | 69609962 T3 | 3/2006 |
| EP | 0042525 A | 12/1981 |
| EP | 0051461 A1 | 5/1982 |
| EP | 0057935 A | 8/1982 |
| EP | 0066356 A1 | 12/1982 |
| EP | 0147937 A1 | 11/1983 |
| EP | 0108959 A1 | 5/1984 |
| EP | 0127894 A | 12/1984 |
| EP | 0342545 A1 | 11/1989 |
| EP | 0827437 B2 | 3/1998 |
| EP | 0827438 B1 | 3/1998 |
| EP | 0 854 002 A1 | 7/1998 |
| EP | 1347859 B1 | 10/2003 |
| FR | 1216019 A | 4/1960 |
| GB | 826780 | 1/1960 |
| GB | 844835 | 8/1960 |
| JP | 53144852 | 12/1978 |
| JP | 58-155704 | 9/1983 |
| JP | 59-56991 | 4/1984 |

(Continued)

OTHER PUBLICATIONS

Machine Translation of JP 2004-114157 A form JPO.JP, published Apr. 15, 2004.*
Search Report dated Jan. 16, 2008 for European Application No. EP07115281.
G.D. Zhang, et al., "Influence of copper on amorphous nickel based brazing alloy", Science and Technology of Welding and Joining, 2001, vol. 6, No. 2.
Chemical Abstracts No. 2000:432500 (Rabinkin, A.: "Optimization of brazing technology, structural integrity, and performance of multichanneled three dimensional metallic structures", XP002463219, in Vianco et al. eds., Advanced Brazing and Soldering Technologies, International Brazing & Soldering Conference Proceedings, American Welding Society, Miami, 2000.

(Continued)

*Primary Examiner* — George Wyszomierski
(74) *Attorney, Agent, or Firm* — Buchanan, Ingersoll & Rooney PC

(57) ABSTRACT

Disclosed are amorphous, ductile brazing foils with a composition consisting essentially of $Fe_{Rest}Ni_aCr_bSi_cB_dP_e$, wherein 0 atomic % ≦ a < 25 atomic %; 0 atomic % ≦ b ≦ 15 atomic %; 1 atomic % ≦ c ≦ 10 atomic %; 4 atomic % ≦ d ≦ 15 atomic %; 1 atomic % ≦ e ≦ 9 atomic %; any impurities ≦ 0.5 atomic %; rest Fe, wherein 2 atomic % ≦ c+e ≦ 10 atomic % and 15 atomic % ≦ c+d+e ≦ 22 atomic %, or consisting essentially of $Fe_{Rest}Ni_aCr_bMo_fCu_gSi_cB_dP_e$, wherein 0 atomic % ≦ a < 25 atomic %; 0 atomic % ≦ b ≦ 15 atomic %; 1 atomic % < c ≦ 10 atomic %; 4 atomic % ≦ d ≦ 15 atomic %; 1 atomic % ≦ e ≦ 9 atomic %; 0 atomic % < f ≦ 3 atomic %; 0 atomic % ≦ g ≦ 3 atomic %; any impurities ≦ 0.5 atomic %; rest Fe, wherein 2 atomic % ≦ c+e ≦ 10 atomic % and 15 atomic % ≦ c+d+e ≦ 22 atomic %. Also disclosed are brazed objects formed using these foils, particularly exhaust gas recirculation coolers and oil coolers, and methods for making the brazing foils and for making the brazed parts.

17 Claims, No Drawings

FOREIGN PATENT DOCUMENTS

| | | |
|---|---|---|
| JP | 60-106691 A | 6/1985 |
| JP | 62-227595 | 10/1987 |
| JP | 63079931 A | 4/1988 |
| JP | 63241135 A | 10/1988 |
| JP | 2019442 A | 1/1990 |
| JP | 02-80533 | 3/1990 |
| JP | 03180425 A | 8/1991 |
| JP | 2004-114157 A | 4/2004 |
| JP | 200528425 A | 2/2005 |
| RU | 2 121 520 C1 | 11/1998 |
| WO | WO 96/37335 | 11/1996 |
| WO | WO 97/34732 | 9/1997 |
| WO | WO 02/18667 A2 | 3/2002 |
| WO | WO 02/38327 A1 | 5/2002 |
| WO | WO 02/098600 A1 | 12/2002 |
| WO | WO 03/106101 A1 | 12/2003 |
| WO | WO 2006/050334 A2 | 5/2006 |
| WO | WO 2006/126953 A1 | 11/2006 |
| WO | WO 2007/022740 A1 | 3/2007 |

OTHER PUBLICATIONS

M. Miglierini et al., "Mössbauer and AC susceptibility study of structurally modified Fe-Ni-Cr-Mo-Si-B-type metallic glasses", J. Phys.: Condens, Matter, Nr. 3, 1991, Seiten 2721-2727, XP002405180.

* cited by examiner ial and thus to a reduction of its mechanical strength. A melting temperature below 1200° C. is desirable in many industrial applications. This limits the maximum iron content of the brazing alloy.
IRON-BASED BRAZING FOIL AND METHOD FOR BRAZING This application claims benefit of the filing date of U.S. Provisional Application Ser. No. 60/929,185, filed Jun. 15, 2007, the entire contents of which are incorporated herein by reference.

BACKGROUND

1. Field

The invention relates to an iron-based brazing foil and to a method for brazing two or more components.

2. Description of Related Art

Soldering is a method for joining metal or ceramic components with the aid of a molten filler material identified as solder. Depending on the processing temperature of the solder, a distinction is made between soft soldering and brazing, the processing temperature typically exceeding the liquidus temperature of the solder by 10° C. to 50° C. While soft solders are processed at temperatures below 450° C., brazing alloys are processed at temperatures above 450° C. Brazing alloys are used in applications where a high mechanical strength of the joint and/or a high mechanical strength at elevated operating temperatures are/is required.

Components made of stainless steel or of Ni and Co alloys are often joined by means of Ni—Cr-based brazing alloys. Ni—Cr-based brazing alloys are typically available as a powder produced in an atomising process or as a paste produced by mixing the atomised powder with organic binders and solvents. In addition to powders and pastes, some Ni-based brazing alloys can be produced as ductile, at least partially amorphous brazing foils by means of a rapid solidification process.

When brazing with pastes, the binders and solvents are broken down. This can result in inadequate rheological and wetting characteristics and thus in a poor joint. These problems can be avoided by using a brazing alloy in the form of a ductile foil, resulting in a more reliable brazed seam. Certain examples of Ni-based brazing alloys which can be produced as ductile foils are disclosed in DE 10 2005 039803 A1.

As raw material costs, in particular for Ni, have increased in recent years, a reduction of the Ni content of these brazing alloys is desirable. One way of achieving this is the partial replacement of Ni by Fe. Certain examples of such alloys are disclosed in WO 02/098600.

SUMMARY

Increasing the iron content of a brazing alloy, however, increases the melting point and thus the processing temperature of the brazing alloy. A higher processing temperature can lead to undesirable coarse grain formation in the parent material and thus to a reduction of its mechanical strength. A melting temperature below 1200° C. is desirable in many industrial applications. This limits the maximum iron content of the brazing alloy.

In addition, an increased iron content results in inadequate rheological and wetting characteristics of the brazing alloy, so that perfect brazed joint can no longer be achieved.

It is, therefore, desirable to provide an iron-based brazing alloy which has good rheological and wetting characteristics and which can be produced as a ductile, at least partially amorphous, foil.

In one embodiment, the invention relates to an amorphous, ductile brazing foil having a composition consisting essentially of $Fe_{Rest}Ni_aCr_bSi_cB_dP_e$, wherein 0 atomic %≦a<25 atomic %; 0 atomic %≦b≦15 atomic %; 1 atomic %≦c≦10 atomic %; 4 atomic %≦d≦15 atomic %; 1 atomic %≦e≦9 atomic %; any impurities≦0.5 atomic %; rest Fe, wherein 2 atomic %≦c+e≦10 atomic % and 15 atomic %≦c+d+e≦22 atomic %.

In another embodiment, the invention relates to an alternative amorphous, ductile brazing foil which also contains molybdenum and copper. This brazing foil has a composition consisting essentially of $Fe_{Rest}Ni_aCr_bMo_fCu_gSi_cB_dP_e$, wherein 0 atomic %≦a<25 atomic %; 0 atomic %≦b≦15 atomic %; 1 atomic %<c≦10 atomic %; 4 atomic %≦d≦15 atomic %; 1 atomic %≦e≦9 atomic %; 0 atomic %<f≦3 atomic %; 0 atomic %≦g≦3 atomic %; any impurities≦0.5 atomic %; rest Fe, wherein 2 atomic %≦c+e≦10 atomic % and 15 atomic %≦c+d+e≦22 atomic %.

According to the invention, the sum of the metalloids Si, B and P and the sum of the Si and P content of an iron-based brazing foil are determined such that the brazing alloys can be produced as ductile foils with good rheological and wetting characteristics. At the same time, the Ni content is reduced compared to an Ni-based brazing alloy and at least partially replaced by iron, so that raw material costs can be kept low.

According to the invention, the sum of the Si, P and B contents lies in the range of 15 atomic %≦(c+d+e)≦22 atomic %, while the sum of the Si and P content lies in the range of 2 atomic %≦(c+e)≦10 atomic %.

In another embodiment, the invention relates to a brazed object comprising a first component and a second component where the first component is permanently joined by adhesive force to the second component by a brazing seam formed from a brazing foil according to any of the above embodiments. The object therefore includes a brazing seam produced from or using a brazing foil according to the invention. Desirably, the first and/or second components contain stainless steel, a nickel alloy, or a cobalt alloy. More particularly, the first and/or second components contain an austenitic stainless steel.

In another embodiment, this brazed object can be an exhaust gas recirculation cooler, or an oil cooler.

In another embodiment, the invention relates to a method for joining two or more components by adhesive force, comprising:

installing a brazing foil according to the embodiments described above between two or more components to be joined, the components to be joined having a higher melting temperature than the brazing foil, to form a brazing composite;

heating the brazing composite to a temperature above the liquidus temperature of the brazing foil; and cooling the brazing composite and forming a brazed joint between the components to be joined.

In another embodiment, the invention relates to a method for the production of an amorphous, ductile brazing foil, comprising:

providing a melt consisting essentially of $Fe_{Rest}Ni_aCr_bSi_cB_dP_e$, wherein 0 atomic %≦a<25 atomic %; 0 atomic %≦b≦15 atomic %; 1 atomic %≦c≦10 atomic %; 4 atomic %≦d≦15 atomic 0%; 1 atomic %≦e≦9 atomic %; any impurities≦0.5 atomic %; rest Fe, wherein 2 atomic %≦c+e≦10 atomic % and 15 atomic %≦c+d+e≦22 atomic %;

or a melt consisting essentially of $Fe_{Rest}Ni_aCr_bMo_fCu_gSi_cB_dP_e$, wherein 0 atomic %≦a<25 atomic %; 0 atomic %≦b≦15 atomic %; 1 atomic %<c≦10 atomic %; 4 atomic %≦d≦15 atomic %; 1 atomic %≦e≦9 atomic %; 0 atomic %<f≦3 atomic %; 0 atomic %≦g≦3 atomic %; any impurities≦0.5 atomic %; rest Fe, wherein 2 atomic %≦c+e≦10 atomic % and 15 atomic %≦c+d+e≦22 atomic %; and rapidly solidifying the melt to form an amorphous brazing foil on a moving cooling surface at a cooling rate of more than approximately $10^5$° C./s.

In another embodiment, the invention relates to method for the production of a brazed object, comprising:

producing an amorphous, ductile brazing foil according to the embodiments described above;

installing the amorphous, ductile brazing foil between components to be joined to form a brazing composite;

heating the brazing composite to a temperature above the liquidus temperature of the amorphous, ductile brazing foil; and cooling the brazing composite and forming a brazed joint between the components to be joined.

DETAILED DESCRIPTION OF SPECIFIC EMBODIMENTS

The invention will be further described by reference to certain specific embodiments, which are intended to illustrate and provide further understanding of the invention, and not to limit the scope of the invention in general, or of the appended claims, in particular.

Fe—Ni- or Fe-based brazing alloys with an Fe content above 40 atomic %, which only contain the elements Si and B to reduce their melting point, have very unfavourable rheological and wetting characteristics. As a result, such brazing foils do not provide a perfectly filled fillet, and the brazed joint is exhibiting very poor fusion with many unbrazed locations. The resulting brazed joint is characterised by highly inadequate mechanical stability and tightness, so that such brazing alloys are unsuitable for industrial applications.

Poor fusion in Fe- and Fe—Ni-based alloys with an Ni content of less than 25 atomic % is to be expected even if brazing is carried out at very high temperatures (e.g. 30° C. above liquidus temperature). This clearly indicates that the poor rheological and wetting characteristics of the Fe-based brazing alloys are an alloy-inherent problem and not caused by an excessively low brazing temperature at which a complete fusion of the brazing alloy cannot be ensured.

It was recognised that rheological characteristics can be improved significantly by the addition of a moderate quantity of P in conjunction with a matched Si—B—P content, so that Fe—Ni—Cr—Si—B-based brazing alloys with an Ni content a, where 0 atomic %≦a<25 atomic % have rheological and wetting characteristics comparable to those of standardised Ni-based brazing alloys. The rheological and wetting characteristics of the present invention ensure an excellent seam quality as required in industrial products.

Although other elements such as manganese can improve the rheological and wetting characteristics, these elements, in particular Mn, usually have a low vapour pressure, which makes them an unsuitable additive for a brazing alloy, which as a rule is processed in a high vacuum, because their use can lead to severe contamination of the high-vacuum furnaces generally used in these processes.

When using Fe—Ni—Cr—Si—B-based brazing alloys with an Fe content>40 atomic %, the melting temperature cannot be kept below 1180° C., because the melting point increases significantly with the Fe content. At approximately 35 atomic % Fe (in combination with 11 atomic % Cr), such Fe—Ni—Cr—Si—B-based brazing alloys exceed a liquidus temperature of 1160° C., so that any further increase of the Fe content leads to alloys which can no longer be used as brazing alloys in industrial processes.

It has been found that an addition of P in place of Si in particular and the optimisation of the metalloids Si+B+P can significantly reduce the melting point without affecting the manufacturing qualities of the alloy as an amorphous foil.

The melting temperature could also be reduced by increasing the B and Si content of the alloy only, but the resulting brazing alloy maintains its inadequate rheological and wetting characteristics. In addition, manufacturing qualities are significantly affected, in particular by an increase of the Si content, if the brazing alloys are produced as an amorphous foil in rapid solidification technology. The result is a brittle foil which can no longer be used in industrial processes.

It has now been found that the addition of 1 to 9 atomic % P and the metalloid combination Si+B+P=15 to 22 atomic %, together with the element combination Si+P=2 to 10 atomic %, ensure excellent casting properties and ductility for the foils, if this composition is processed as an amorphous foil.

The use of P for reducing the melting point is known, but the addition of phosphorus can generate brittle phases (phosphides) in the brazing seam. This can result in an inadequate strength of the brazed joint and in a limited ductility of the joint. It has now been found that brazing alloys containing P no longer have this disadvantage if the P content remains at <9 atomic % and the other metalloids are added as described herein. In this way, the positive effect of the addition of P, which reduces the melting point and significantly improves the rheological and wetting characteristics of the alloy, can be utilised without the serious formation of brittle phosphides in the brazing seam. In addition, it has been found that an addition of P at <9 atomic %, in particular in place of Si, does not have any negative effect on the casting properties and ductility of the amorphous foils.

The iron-based foils according to the invention exhibit improved rheological and wetting characteristics in the brazing process, so that a perfect seam can be produced reliably.

In one embodiment of the invention, the brazing foil contains an addition of molybdenum in molybdenum content f, wherein 0<f≦3.0 atomic %, and no addition of copper. In a further embodiment, the brazing foil contains an addition of molybdenum in a molybdenum content f and an addition of copper in a copper content g, wherein 0<f≦3.0 atomic % and 0≦g≦3.0 atomic %.

In one embodiment, the brazing foil preferably contains a combination of 0.2 to 1.5 atomic % molybdenum and 0.5 to 3 atomic % copper to improve its corrosion resistance. In contrast to an increased chromium content, adding a combination of Mo and Cu does not lead to an undesirable increase of the liquidus temperature and thus of the processing temperature of the brazing alloy.

In one embodiment, the brazing foil can contain no nickel, that is, the nickel content a is such that 0<a<25. When no nickel is present, i.e., when a=0, this further reduces raw material costs. In another embodiment, an Ni content a of 5 atomic %≦a<25 atomic % is specified.

In further embodiments, the brazing foil either contains no chromium or has a Cr content b of 2 atomic %≦b≦15 atomic % or 2 atomic %≦b≦9 atomic % respectively.

In one embodiment, the brazing foil is up to 50%, preferably up to 80%, amorphous.

The brazing foils may have a thickness D of at least 25 μm or a thickness D of 25 μm≦D≦40 μm. They may further have a width B of 20 mm≦B≦200 mm or a width B of 40 mm≦B≦200 mm. The brazing foils according to the invention can therefore be produced in dimensions suitable for many different applications.

The brazing foils advantageously have a liquidus temperature of less than 1180° C. or less than 1160° C. This is desirable, because the maximum temperature for many industrial brazing processes, in particular when joining stainless steel parent materials, is limited to a maximum of approximately 1200° C. As a rule, the aim is the lowest possible brazing temperature, because an undesirable coarse grain formation can occur in the parent material at temperatures above 1000° C. This undesirable coarse grain formation reduces the mechanical strength of the parent material, which is critical for many technical applications, such as heat exchangers.

A brazed object comprising a first component and a second component is also specified by the present invention. The first component is joined by adhesive force to the second component by means of a brazing seam produced with a brazing foil according to any of the above embodiments. The object therefore includes a brazing seam produced by means of a brazing foil according to the invention.

A brazing seam made using an amorphous, ductile brazing foil differs from a brazing seam produced by means of a crystalline powder at least because of the differences in size of the B, Si and P hard phases.

An exhaust gas recirculation cooler and an oil cooler comprising a first component and a second component are further specified, wherein the first component is joined by adhesive force to the second component by means of a brazing seam produced with a brazing foil according to any of the above embodiments.

In one embodiment, the first component and the second component are made of austenitic stainless steel. As an alternative, the components can be made of an Ni alloy or a Co alloy.

The brazing seam between the two components can have a thickness of more than 20 μm.

Methods for joining two or more components by adhesive force are also specified. In one method, a brazing foil according to any of the above embodiments is installed between two or more components to be joined. The components to be joined have a higher melting temperature than the brazing foil. The brazing composite is heated to a temperature above the liquidus temperature of the brazing alloy and below the melting temperature of the two components. The brazing composite is then cooled while a brazed joint forms between the components to be joined.

The components to be joined may be parts of a heat exchanger or an exhaust gas recirculation cooler or an oil cooler or components of a heat exchanger or an exhaust gas recirculation cooler or an oil cooler.

The present invention also specifies a method for the production of an amorphous, ductile brazing foil. In a first embodiment, a melt consisting of $Fe_{Rest}Ni_aCr_bSi_cB_dP_e$, wherein 0 atomic % $\leq$ a < 25 atomic %; 0 atomic % $\leq$ b $\leq$ 15 atomic %; 1 atomic % $\leq$ c $\leq$ 10 atomic %; 4 atomic % $\leq$ d $\leq$ 15 atomic %; 1 atomic % $\leq$ e $\leq$ 9 atomic %; any impurities $\leq$ 0.5 atomic %; rest Fe is produced, wherein 2 atomic % $\leq$ c+e $\leq$ 10 atomic % and 15 atomic % $\leq$ c+d+e $\leq$ 22 atomic %. An amorphous, ductile brazing alloy is then produced by rapid solidification of the melt on a moving cooling surface at a cooling rate of more than approximately $10^{5}$° C./s.

In a further embodiment of this method, an amorphous, ductile brazing foil is produced from a melt consisting of $Fe_{Rest}Ni_aCr_bMo_fCu_gSi_cB_dP_e$, wherein 0 atomic % $\leq$ a < 25 atomic %; 0 atomic % $\leq$ b $\leq$ 15 atomic %; 1 atomic % < c $\leq$ 10 atomic %; 4 atomic % $\leq$ d $\leq$ 15 atomic %; 1 atomic % $\leq$ e $\leq$ 9 atomic %; 0 atomic % < f $\leq$ 3 atomic %; 0 atomic % $\leq$ g $\leq$ 3 atomic %; any impurities $\leq$ 0.5 atomic %; rest Fe, wherein 2 atomic % $\leq$ c+e $\leq$ 10 atomic % and 15 atomic % $\leq$ c+d+e $\leq$ 22 atomic %.

The present invention specifies a method for joining two or more components by adhesive force, which comprises the following steps:

the provision of a melt consisting of $Fe_{Rest}Ni_aCr_bSi_cB_dP_e$, wherein 0 atomic % $\leq$ a < 25 atomic %; 0 atomic % $\leq$ b $\leq$ 15 atomic %; 1 atomic % $\leq$ c $\leq$ 10 atomic %; 4 atomic % $\leq$ d $\leq$ 15 atomic %; 1 atomic % $\leq$ e $\leq$ 9 atomic %; any impurities $\leq$ 0.5 atomic %; rest Fe, wherein 2 atomic % $\leq$ c+e $\leq$ 10 atomic % and 15 atomic % $\leq$ c+d+e $\leq$ 22 atomic %;

the production of an amorphous brazing foil by rapid solidification of the melt on a moving cooling surface at a cooling rate of more than approximately $10^{5}$° C./s;

the formation of a brazing composite by applying the brazing alloy foil between the metal components to be joined;

the heating of the brazing composite to a temperature above the liquidus temperature of the brazing alloy foil;

the cooling of the brazing composite accompanied by the formation of a joint between the metal components to be joined.

A further method for joining two or more components by adhesive force comprises the following steps:

the provision of a melt consisting of a melt consisting of $Fe_{Rest}Ni_aCr_bMo_fCu_gSi_cB_dP_e$, wherein 0 atomic % $\leq$ a < 25 atomic %; 0 atomic % $\leq$ b $\leq$ 15 atomic %; 1 atomic % < c $\leq$ 10 atomic %; 4 atomic % $\leq$ d $\leq$ 15 atomic %; 1 atomic % $\leq$ e $\leq$ 9 atomic %; 0 atomic % < f $\leq$ 3 atomic %; 0 atomic % $\leq$ g $\leq$ 3 atomic %; any impurities $\leq$ 0.5 atomic %; rest Fe, wherein 2 atomic % $\leq$ c+e $\leq$ 10 atomic % and 15 atomic % $\leq$ c+d+e $\leq$ 22 atomic %;

the production of an amorphous brazing foil by rapid solidification of the melt on a moving cooling surface at a cooling rate of more than approximately $10^{5}$° C./s;

the formation of a brazing composite by applying the brazing alloy foil between the metal components to be joined;

the heating of the brazing composite to a temperature above the liquidus temperature of the brazing alloy foil;

the cooling of the brazing composite accompanied by the formation of a joint between the metal components to be joined.

The joining process by adhesive force as described above represents a brazing process using the iron-based brazing foil according to the invention, by means of which perfect brazed joint, desirably without any joining faults, can be produced.

The invention is described in detail below with reference to embodiments and comparative examples.

1$^{st}$ Embodiment

In a first embodiment, the influence of the metalloids Si, B and P on the rheological and wetting characteristics and the liquidus temperature of iron-based brazing foils was studied.

At least partially amorphous foils where produced by means of rapid solidification technology. A melt of the desired composition is prepared, sprayed onto a moving cooling surface such as a casting wheel or casting drum and cooled at a rate of more than approximately $10^{5}$° C./s. The cooled strip is then released from the cooling surface at a temperature between 100° C. and 300° C. and directly wound to form a so-called coil or wound onto a reel to provide an amorphous, ductile brazing alloy foil. The foils have a thickness of approximately 25 μm.

In the first embodiment, four special melts were prepared. The compositions of these special melts are listed in Table 1 and are described by the formula $Fe_{45}Ni_{25}Cr_{11}Mo_1$(Si, P, B)$_{18}$. The sum of the metalloids Si, B and P is kept to 18 atomic %, the boron content to 9 atomic %, and the ratio between Si and P varies.

TABLE 1

| Alloy | Fe (at. %) | Ni (at. %) | Mo (at. %) | Cr (at. %) | Si (at. %) | B (at. %) | P (at. %) | Rheological and wetting characteristics/brazing properties | Liquidus temperature (° C.) |
|---|---|---|---|---|---|---|---|---|---|
| 1 | Rest | 25 | 1 | 11 | 9 | 9 | 0 | − | 1176 |
| 2 | Rest | 25 | 1 | 11 | 7 | 9 | 2 | + | 1149 |
| 3 | Rest | 25 | 1 | 11 | 5 | 9 | 4 | + | 1127 |
| 4 | Rest | 25 | 1 | 11 | 3 | 9 | 6 | + | 1092 |

The first melt and the brazing foil produced therefrom contain 0 atomic % phosphorus and 9 atomic % Si. This first alloy is a reference alloy outside the composition range according to the invention.

The second melt and the second brazing foil contain 2 atomic % phosphorus and 7 atomic % Si, the third melt and the third brazing foil contain 4 atomic % phosphorus and 5 atomic % Si and the fourth melt and the fourth brazing foil contain 6 atomic % phosphorus and 3 atomic % Si. These products are identified in Table 1 as alloys No. 2, 3 and 4.

The liquidus temperature of these brazing foils was measured and is listed in Table 1. The liquidus temperature decreases as the P content increases. At a P content of 0 atomic %, the liquidus temperature is 1176° C., at 2 atomic % 1149° C., at 4 atomic % 1127° C. and at 6 atomic % 1092° C.

The rheological and wetting characteristics and the brazing properties were also studied. The first brazing foil without phosphorus has poor rheological and wetting characteristics, which are indicated by "−" in Table 1. In contrast, the phosphorus-containing brazing foils No. 2, 3 and 4 have good rheological and wetting characteristics indicated by "+" in Table 1. The brazing foils No. 2, 3 and 4 are therefore suitable for industrial processes.

2$^{nd}$ Embodiment

In a second embodiment, two further special melts are prepared and brazing foils are produced by means of rapid solidification technology as described above. Composition, liquidus temperature and rheological and wetting characteristics are listed in Table 2.

TABLE 2

| Alloy | Fe (at. %) | Ni (at. %) | Mo (at. %) | Cr (at. %) | Si (at. %) | B (at. %) | P (at. %) | Rheological and wetting characteristics/brazing properties | Liquidus temperature (° C.) |
|---|---|---|---|---|---|---|---|---|---|
| 5 | Rest | 10 | 0 | 7 | 5 | 11 | 0 | − | 1203 |
| 6 | Rest | 10 | 0 | 7 | 2 | 9 | 5 | + | 1143 |

These two brazing foils are identified as alloys No. 5 and 6 in the table.

The alloys of the second embodiment have a composition which can be described by the formula Fe$_{67}$Ni$_{10}$Cr$_7$Mo$_0$(Si, P, B)$_{16}$. This formula differs from the first embodiment by its molybdenum content, the sum of the metalloids Si, B and P and a lower Ni and Cr content. The alloys of the second embodiment do not contain molybdenum. The sum of the metalloids is slightly lower, being 16 atomic %.

Alloy No. 5 does not contain any phosphorus and is outside the scope of the present invention. Alloy No. 6 contains 5 atomic % P, 2 atomic % Si and 9 atomic % B, has good rheological and wetting characteristics identified by "+" in Table 2 and a liquidus temperature of 1143° C. Alloy No. 6 is therefore suitable for industrial processes. Alloy No. 5, on the other hand, has poor rheological and wetting characteristics identified by "−" in Table 2 and a liquidus temperature of 1203° C.

3$^{rd}$ Embodiment

In a third embodiment, two further special melts are prepared and brazing foils are produced by means of rapid solidification technology as described above. Composition, liquidus temperature and rheological and wetting characteristics are listed in Table 3. These two brazing foils are identified as alloys No. 7 and 8 in the table.

TABLE 3

| Alloy | Fe (at. %) | Ni (at. %) | Mo (at. %) | Cr (at. %) | Si (at. %) | B (at. %) | P (at. %) | Rheological and wetting characteristics/brazing properties | Liquidus temperature (° C.) |
|---|---|---|---|---|---|---|---|---|---|
| 7 | Rest | 0 | 0 | 3 | 2 | 17 | 0 | − | 1164 |
| 8 | Rest | 0 | 0 | 3 | 2 | 10 | 7 | + | 1046 |

The alloys of the third embodiment have a composition which can be described by the formula Fe$_{78}$Ni$_0$Cr$_3$Mo$_0$(Si, P, B)$_{19}$. This formula differs from the first embodiment by its molybdenum and Ni content, the sum of the metalloids Si, B and P and a lower Cr content. The alloys of the third embodiment contain neither molybdenum nor nickel. The sum of the metalloids is 19 atomic %, the Si content 2 atomic %.

Alloy No. 7 does not contain any phosphorus and is outside the scope of the present invention. Alloy No. 7 has poor rheological and wetting characteristics identified by "−" in Table 1 and a liquidus temperature of 1164° C.

Alloy No. 8 according to the invention contains 7 atomic % P, 2 atomic % Si and 10 atomic % B, has good rheological and wetting characteristics identified by "+" in Table 2 and a low liquidus temperature of 1046° C. Alloy No. 8 is therefore suitable for industrial processes.

4$^{th}$ Embodiment

In a fourth embodiment nine further special melts are prepared and brazing foils are produced by means of rapid solidification technology as described above. Composition and ductility of the foils are listed in Table 4. These brazing foils are identified as alloys No. 9 to 17 in Table 4.

TABLE 4

| Alloy | Fe (at. %) | Ni (at. %) | Mo/Cu (at. %) | Cr (at. %) | Si (at. %) | B (at. %) | P (at. %) | Si + P (at. %) | Manufacturing quality ductility at 30 μm foil thickness |
|---|---|---|---|---|---|---|---|---|---|
| 9  | Rest | 10 | 0     | 7 | 2  | 12 | 5 | 7  | ++ |
| 10 | Rest | 10 | 1/0.5 | 7 | 5  | 11 | 2 | 7  | ++ |
| 11 | Rest | 10 | 1     | 7 | 3  | 10 | 5 | 8  | ++ |
| 12 | Rest | 10 | 0     | 7 | 3  | 9  | 6 | 9  | ++ |
| 13 | Rest | 10 | 0     | 7 | 2  | 10 | 7 | 9  | ++ |
| 14 | Rest | 10 | 0     | 7 | 2  | 10 | 8 | 10 | +  |
| 15 | Rest | 10 | 0     | 7 | 11 | 8  | 1 | 12 | −  |
| 16 | Rest | 10 | 0     | 7 | 4  | 8  | 9 | 13 | −  |
| 17 | Rest | 10 | 0     | 7 | 6  | 7  | 7 | 13 | −  |

The alloys of the fourth embodiment have a composition containing 10 atomic % Ni and 7 atomic % Cr. Alloys No. 9 and 12 to 17 do not contain any molybdenum. Alloy No. 10 contains 1 atomic % Mo and 0.5 atomic % Cu, while alloy No. 11 contains 1 atomic % Mo and no copper. The sum of the metalloids is 18 atomic % to 20 atomic In the fourth embodiment, the relationship between the sum of the Si and P content and the manufacturing qualities and ductility of the foils was studied. The foils were produced by means of rapid solidification technology as described above and have a thickness of 30 μm and a width of 25 mm.

Table 4 shows that the casting properties and ductility of the foils at 30 μm as required in many technical applications can only be achieved at a combined Si and P content below 10 atomic %. This is identified by "++" in the table. If this value is exceeded, as in the alloys No. 15 to 17, the production of amorphous foils involves serious problems, and ductility is poor. This is indicated by "−" in Table 4.

5$^{th}$ Embodiment

In the fifth embodiment, the relationship between the sum of the Si and P content and the manufacturing qualities and ductility of the foils was studied as well. Composition and ductility of the foils is given in Table 5.

The alloys of the fifth embodiment have a composition containing 20 atomic % Ni and 11 atomic % Cr. The Ni content and the Cr content are slightly higher than in the fourth embodiment. Alloys No. 20 to 26 do not contain any molybdenum. Alloy No. 18 contains 1 atomic % Mo, alloy No. 19 1 atomic % Mo and 0.5 atomic % Cu. As in the fourth embodiment, the sum of the metalloids is 18 atomic % to 21 atomic %.

The foils were produced by means of rapid solidification technology as described above and have a thickness of 30 μm and a width of 25 mm as in the fourth embodiment.

In the fifth embodiment with its higher Ni and Cr content, the casting properties and ductility of the foils at 30 μm as required in many technical applications can likewise only be achieved at a combined Si and P content below 10 atomic %. This is identified by "++" in Table 5. If this value is exceeded, as in the alloys No. 11 to 13, the production of amorphous foils involves problems, and ductility is poor. This is indicated by "−" in Table 5.

The invention having been described by reference to certain of its specific embodiments, it will be recognized that departures from these embodiments can be made within the spirit and scope of the invention, and that these specific embodiments are not limiting of the appended claims.

The invention claimed is:

1. An amorphous, ductile brazing foil having a composition consisting essentially of $Fe_{Rest}Ni_aCr_bMo_fCu_gSi_cB_dP_e$, 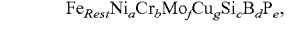

wherein 0 atomic % ≦ a < 25 atomic %; 0 atomic % ≦ b ≦ 15 atomic %; 1 atomic % < c ≦ 10 atomic %; 4 atomic % ≦ d ≦ 15 atomic %; 1 atomic % ≦ e ≦ 9 atomic %; 0 atomic % < f ≦ 3 atomic %; 0 atomic % ≦ g ≦ 3 atomic %; any impurities ≦ 0.5 atomic %; rest Fe, wherein 2 atomic % ≦ c+e ≦ 10 atomic % and 15 atomic % ≦ c+d+e ≦ 22 atomic %.

TABLE 5

| Alloy | Fe (at. %) | Ni (at. %) | Mo/Cu (at. %) | Cr (at. %) | Si (at. %) | B (at. %) | P (at. %) | Si + P (at. %) | Manufacturing quality ductility at 30 μm foil thickness |
|---|---|---|---|---|---|---|---|---|---|
| 18 | Rest | 20 | 1     | 11 | 2 | 12 | 5 | 7  | ++ |
| 19 | Rest | 20 | 1/0.5 | 11 | 5 | 10 | 4 | 9  | ++ |
| 20 | Rest | 20 | 0     | 11 | 3 | 9  | 6 | 9  | ++ |
| 21 | Rest | 20 | 0     | 11 | 7 | 9  | 2 | 9  | ++ |
| 22 | Rest | 20 | 0     | 11 | 5 | 10 | 4 | 9  | ++ |
| 23 | Rest | 20 | 0     | 11 | 3 | 9  | 6 | 9  | ++ |
| 24 | Rest | 20 | 0     | 11 | 5 | 9  | 6 | 11 | −  |
| 25 | Rest | 20 | 0     | 11 | 5 | 8  | 7 | 12 | −  |
| 26 | Rest | 20 | 0     | 11 | 7 | 7  | 6 | 13 | −  |

2. The amorphous, ductile brazing foil according to claim 1, wherein the content of Ni, a, is such that 5 atomic % ≤ a < 25 atomic %.

3. The amorphous, ductile brazing foil according to claim 1, wherein the content of Ni, a, is 0 atomic %.

4. The amorphous, ductile brazing foil according to claim 1, wherein the content of Cr, b, is such that 2 atomic % ≤ b ≤ 15 atomic %.

5. The amorphous, ductile brazing foil according to claim 1, wherein the brazing foil is at least 50% amorphous.

6. The amorphous, ductile brazing foil according to claim 5, wherein the brazing foil is at least 80% amorphous.

7. The amorphous, ductile brazing foil according to claim 1, having a thickness D of at least 25 μm.

8. The amorphous, ductile brazing foil according to claim 7, wherein the thickness D is such that 25 μm ≤ D ≤ 40 μm.

9. The amorphous, ductile brazing foil according to claim 1, having a width B such that 20 mm ≤ B ≤ 200 mm.

10. The amorphous, ductile brazing foil according to claim 9, wherein the width B is such that 40 mm ≤ B ≤ 200 mm.

11. The amorphous, ductile brazing foil according to claim 1, having a liquidus temperature of less than 1180° C.

12. The amorphous, ductile brazing foil according to claim 11, wherein the liquidus temperature is less than 1160° C.

13. The amorphous, ductile brazing foil according to claim 1, wherein the molybdenum content, f, and the copper content, g, are such that 0.2 ≤ f ≤ 1.5 atomic % and 0.5 ≤ g ≤ 1.5 atomic %.

14. A brazed object comprising a first component and a second component, permanently joined by adhesive force to the first component by a brazing seam formed from the brazing foil according to claim 1.

15. The brazed object according to claim 14, wherein one or both of the first component and the second component comprise austenitic stainless steel, a nickel alloy, or a cobalt alloy.

16. The brazed object according to claim 14, wherein the brazing seam has a thickness > 20 μm.

17. The brazed object according to claim 14, wherein the brazed object is an exhaust gas recirculation cooler or an oil cooler.

* * * * *

UNITED STATES PATENT AND TRADEMARK OFFICE
CERTIFICATE OF CORRECTION

PATENT NO. : 8,052,809 B2
APPLICATION NO. : 12/155399
DATED : November 8, 2011
INVENTOR(S) : Thomas Hartmann et al.

It is certified that error appears in the above-identified patent and that said Letters Patent is hereby corrected as shown below:

Column 9, line 33 "20 atomic In" should read --20 atomic %. In--

Column 10, lines 48 and 49 "0 atomic % < f ≤ 3 atomic %" should read --0.2 atomic % < f ≤ 3 atomic %--

Column 10, line 49 "0 atomic % ≤ g ≤ 3 atomic %" should read --0.5 atomic % ≤ g ≤ 3 atomic %--

Signed and Sealed this
Twentieth Day of March, 2012

David J. Kappos
*Director of the United States Patent and Trademark Office*